(12) United States Patent
Kamiya et al.

(10) Patent No.: US 7,694,530 B2
(45) Date of Patent: Apr. 13, 2010

(54) CHEMICAL STRENGTHENING TREATMENT METHOD OF MAGNETIC DISK GLASS SUBSTRATE

(75) Inventors: Naohiro Kamiya, Tokyo (JP); Hideki Isono, Tokyo (JP)

(73) Assignee: Hoya Corporation, Tokyo (JP)

( * ) Notice: Subject to any disclaimer, the term of this patent is extended or adjusted under 35 U.S.C. 154(b) by 387 days.

(21) Appl. No.: 10/573,790

(22) PCT Filed: Sep. 28, 2004

(86) PCT No.: PCT/JP2004/014564

§ 371 (c)(1),
(2), (4) Date: Oct. 18, 2006

(87) PCT Pub. No.: WO2005/031715

PCT Pub. Date: Apr. 7, 2005

(65) Prior Publication Data

US 2007/0039353 A1    Feb. 22, 2007

(30) Foreign Application Priority Data

Sep. 29, 2003  (JP) ............................ 2003-338838

(51) Int. Cl.
*C03C 21/00* (2006.01)
(52) U.S. Cl. .................... 65/30.14; 65/30.1; 65/30.13; 427/431
(58) Field of Classification Search ............... 65/30.14, 65/60.7; 75/368, 402; 427/431
See application file for complete search history.

(56) References Cited

U.S. PATENT DOCUMENTS 3,773,489 A * 11/1973 Forker et al. ............... 65/30.14

6,534,120 B1    3/2003  Ozawa et al.
2003/0113537 A1  6/2003  Taniguchi et al.

FOREIGN PATENT DOCUMENTS

| JP | 7-109112 A | 4/1995 |
| JP | 10-194785 A | 7/1998 |
| JP | 10-194786 A | 7/1998 |
| JP | 11-25454 A | 1/1999 |
| JP | 2000-203888 A | 7/2000 |
| JP | 2001-6168 A | 1/2001 |
| JP | 2001-72444 A | 3/2001 |
| JP | 2002-179415 A | 6/2002 |

OTHER PUBLICATIONS

AZoM materials. "Dealing with Unused Salt from Salt Bath Furnaces". http://www.azom.com/details.asp?Article=1661. Sep. 26, 2002.*
Udo J.A. Behner. "Potassium Dichromate". http://www.crystalgrowing.com/xx_galer.y/kadi.htm. Nov. 8, 1999.*

* cited by examiner

*Primary Examiner*—Steven P Griffin
*Assistant Examiner*—Cynthia Szewczyk
(74) *Attorney, Agent, or Firm*—Sughrue Mion, PLLC

(57) ABSTRACT

Chemical strengthening treatment is performed by first providing a granular chemical strengthening salt so as to prevent spread in atmosphere at the time of introduction of chemical strengthening salt in a treating vessel, introducing the chemical strengthening salt in a treating vessel, melting the chemical strengthening salt into molten chemical strengthening salt and bringing a glass disc into contact with the molten chemical strengthening salt. The granular chemical strengthening salt is, for example, one obtained by forming of a powdery chemical strengthening salt material into grains. A chemically strengthened glass substrate for magnetic disk can be obtained through the process of carrying out chemical strengthening treatment of magnetic disk glass substrates. A magnetic disk can be obtained by forming at least a magnetic layer on the chemically strengthened glass substrate for magnetic disk.

7 Claims, 1 Drawing Sheet

CHEMICAL STRENGTHENING TREATMENT METHOD OF MAGNETIC DISK GLASS SUBSTRATE

TECHNICAL FIELD

This invention relates to methods of manufacturing a magnetic disk adapted to be mounted in a magnetic recording device such as a HDD (hard disk drive) and a glass substrate used for the magnetic disk.

BACKGROUND ART

In recent years, a rapid increase in recording density has been achieved in magnetic recording devices such as HDDs. An information recording medium adapted to be mounted in the HDD is a magnetic disk and is manufactured by forming a magnetic layer and so on on a substrate such as an aluminum-based alloy substrate or a glass substrate. In the HDD, a magnetic head records an information signal on the magnetic layer as a magnetized pattern or reproduces it while flying over the magnetic disk rotating at a high speed.

Recently, attention has been paid particularly to a glass substrate as a magnetic disk substrate suitable for increasing the recording density. Since the glass substrate can achieve a smooth surface, it is suitable for a magnetic head with low flying height and is a substrate suitable for improving the S/N ratio of a recording signal and increasing the recording density. That is, the glass substrate can be said to be a substrate excellent in adaptation to the low flying height of the magnetic head. However, the glass substrate is a high-strength and high-rigidity material on the one hand but is a fragile material on the other. Therefore, various strengthening methods have been attempted. As a glass strengthening method normally used, there is a crystallization method or a chemical strengthening method. As a chemical strengthening method of a glass substrate for an information recording medium such as a magnetic disk, there is known, for example, a technique of Patent Document 1 (Japanese Unexamined Patent Application Publication No. 2000-203888) or a technique of Patent Document 2 (Japanese Unexamined Patent Application Publication No. 2001-72444).

DISCLOSURE OF THE INVENTION

Recently, the information recording density of HDD has increased and reached to 40 Gbits/inch$^2$ or more. In order to realize such a high information recording density, it is necessary to reduce, to the utmost, a distance (spacing loss) between a recording/reproducing element of a magnetic head and a magnetic layer of a magnetic disk. In order to achieve the information recording density of 40 Gbits/inch$^2$ or more, it is necessary to smooth the surface of the magnetic disk so as not to cause occurrence of contact between the magnetic head and the magnetic disk rotating at high speed even if the flying height of the magnetic head is 10 nm. When the magnetic head is brought into contact or pseudo-contact with the surface of the magnetic disk, there is a case where crash failure is caused to damage the HDD.

Recently, in terms of realizing the high recording density, a magnetoresistive effect element (e.g. GMR element or TMR element) has tended to be adopted as a reproducing element of a magnetic head. As failure unique to the magnetic head incorporating such a magnetoresistive effect element, there is a case where thermal asperity failure is caused. The thermal asperity failure occurs in the case where the magnetoresistive effect element is slightly heated and/or cooled through adiabatic compression and/or adiabatic expansion of air when the magnetic head passes, while flying, over a fine convex or concave shape on the surface of a magnetic disk. Naturally, it also occurs when the magnetoresistive effect element contacts the fine convex or concave shape on the surface of the magnetic disk.

Since, as described above, the thermal asperity failure occurs even when the magnetic head and the magnetic disk do not contact with each other, the surface of the magnetic disk must be extremely well smoothed and cleaned with respect to the magnetic head incorporating the magnetoresistive effect element. When the thermal asperity failure has occurred, a thermal asperity signal is superimposed on a normal reproduced signal and, therefore, accurate reading of recorded bits is impeded.

The present applicant has studied a causal relation between thermal asperity failure of a magnetic head and manufacturing processes of a magnetic disk glass substrate and has assiduously conducted researches about predetermined countermeasures, particularly, about the thermal asperity failure and a chemical strengthening process. Patent Document 1 and Patent Document 2 as described before provide the results thereof. However, when the flying height of the magnetic head becomes 10 nm or less like recently, it is predicted that there is a case where such failure can no longer be sufficiently suppressed only by the conventional measures. Although the error correction technique using ECC (Error Correcting Code) has recently been developed, the actuality is that it is difficult to safely operate an HDD without failure when the flying height of the magnetic head is 10 nm or less.

In recent years, as a result of rapid increase in market use of HDDs, further price reduction has been required. Particularly, the HDD market use has rapidly expanded, in addition to the conventional use for mounting in computers, to uses for mounting in car navigation systems, PDAs (portable information terminals), and portable telephones. Under these circumstances, there are strict demands for cost reduction also with respect to magnetic disk glass substrates. Among the manufacturing processes of the magnetic disk glass substrates, it has been found out that the chemical strengthening process and its subsequent cleaning process are one of main factors of increasing a cost. For example, since a chemical strengthening salt for use in the chemical strengthening process is a high oxidizer material, a certain cost is incurred for purchase, transportation, and storage thereof. Further, in the cleaning process after the chemical strengthening process, it is necessary to carry out precision cleaning for securely removing foreign matter adhered to the surface of the glass substrate in the chemical strengthening process. This is because if the removal of foreign matter is insufficient, it may cause thermal asperity failure or head crash failure. The precision cleaning is a cost pressure factor, but, in order to suppress such failure even in the case of a further narrow magnetic head flying height, the precision cleaning should be leveled up by bearing a further cost. Consequently, it has been an impeding factor for offering chemically strengthened magnetic disk glass substrates at low prices.

This invention has been made in view of such problems and its object is, firstly, to provide a chemically strengthened glass substrate for a magnetic disk and the magnetic disk that can prevent thermal asperity failure and head crash failure, for example, even in the case of a narrow magnetic head flying height of 10 nm or less and, secondly, to provide a low-priced chemically strengthened glass substrate for a magnetic disk and the magnetic disk that can prevent thermal asperity failure and head crash failure.

For solving the foregoing problems, this invention has the following structures.

(Constitution 1) A chemical strengthening treatment method of a magnetic disk glass substrate, wherein a chemical strengthening salt is introduced into a treatment vessel and is melted to obtain a molten chemical strengthening salt and a glass disk is brought into contact with said molten chemical strengthening salt so as to be chemically strengthened, said method is characterized by using a granular chemical strengthening salt so as to prevent scattering in an atmosphere, on introducing the chemical strengthening salt into the treatment vessel.

(Constitution 2) A chemical strengthening treatment method of a magnetic disk glass substrate, according to Constitution 1, characterized by using the chemical strengthening salt obtained by shaping powder of a chemical strengthening salt material into grains.

(Constitution 3) A chemical strengthening treatment method of a magnetic disk glass substrate, according to Constitution 1 or 2, characterized in that said glass disk is made of aluminosilicate glass.

(Constitution 4) A method of manufacturing a chemically strengthened magnetic disk glass substrate, characterized by comprising a step of carrying out a chemical strengthening treatment by a chemical strengthening treatment method of a magnetic disk glass substrate according to any of Constitutions 1 to 3.

(Constitution 5) A method of manufacturing a magnetic disk, characterized by forming at least a magnetic layer on the glass substrate obtained by the method of manufacturing a chemically strengthened magnetic disk glass substrate according to Constitution 4.

In this invention, as the chemical strengthening salt introduced into the treatment vessel, use is made of grains of chemical strengthening salt (granular chemical strengthening salt), differing from the conventional powder of chemical strengthening salt. Therefore, since scattering particles is suppressed on introducing the chemical strengthening salt into the treatment vessel, it is possible to prevent thermal asperity failure and head crash failure caused by adhesion of foreign matter such as the particles.

There is a case where the powdery chemical strengthening salt absorbs moisture in an atmosphere to solidify amorphously. Such an amorphously solidified chemical strengthening salt becomes hard and heavy and increases in surface roughness. Therefore, if it is introduced into the treatment vessel as it is, there is a case where the treatment vessel is damaged. In this case, in order to prevent the moisture adsorption, necessity arises for strictly implementing humidity control of the atmosphere and thus the cost increases. In this invention, since the granular chemical strengthening salt is used, amorphous solidification due to moisture adsorption like the powdery body does not occur and, even if it is introduced into the treatment vessel as it is, there is no possibility of damaging the treatment vessel. Further, since the foregoing strict humidity control is not required, a cost reduction can be achieved.

Further, the granular chemical strengthening salt is, as compared with the powdery one, easy to handle because spreading or scattering does not occur and so on, and therefore, it is possible to reduce the cost for purchase, transportation, and storage.

As described above, in this invention, since it is possible to suppress contamination of the molten chemical strengthening salt caused by generation of particles at the time of introducing the chemical strengthening salt into the treatment vessel or generation of dust or the like in the treatment vessel due to damage thereof, the pure molten chemical strengthening salt can be obtained. Therefore, thermal asperity failure and head crash failure can be effectively prevented. Further, since the molten chemical strengthening salt can be pure, thermal asperity failure and head crash failure can be suitably prevented without particularly leveling up the precision cleaning after the chemical strengthening process and, therefore, it is possible to cope with a low flying height of 10 nm or less of a magnetic head. Further, the cost reduction can also be achieved.

In this invention, the treatment vessel is a vessel where the chemical strengthening salt is introduced and melted. In an embodiment where the chemical strengthening salt is directly introduced into a chemical strengthening treatment vessel where the chemical strengthening treatment process is carried out, the treatment vessel is that chemical strengthening treatment vessel. On the other hand, in an embodiment where a melting treatment vessel for melting the chemical strengthening salt is provided and the molten chemical strengthening salt is supplied from the melting treatment vessel to a chemical strengthening treatment vessel where the chemical strengthening treatment process is carried out, the treatment vessel is that melting treatment vessel.

In this invention, the term "granular" represents any shape that prevents spread or scatter of the chemical strengthening salt into an atmosphere when introducing it into the treatment vessel and includes, for example, a spherical shape such as a globe or an ellipsoid, a hemispherical shape, a cylindrical shape, a prism shape such as a rectangular parallelepiped, and so on. In terms of particularly preferably obtaining the function of this invention, a chipped shape with no corners is preferable and, as such a shape, there is cited, for example, the foregoing spherical shape or hemispherical shape.

As a material of the chemical strengthening salt in this invention, it is preferably a material containing sodium nitrate or potassium nitrate. This is because if a glass, particularly a suitable aluminosilicate glass, is chemically strengthened by the use of such a chemical strengthening salt, predetermined suitable rigidity and impact resistance can be obtained as a chemically strengthened magnetic disk glass substrate. Sodium nitrate and potassium nitrate may be used alone or in combination.

The granular chemical strengthening salt in this invention is easily obtained by forming the powdery chemical strengthening salt material into grains, for example, by the use of a tabletting machine. By the use of such a method of forming or shaping the material into grains, it is easy to form the grains into desired shape and size, which is thus preferable.

It is not necessary that the grain size of the granular chemical strengthening salt be particularly limited. However, in terms of preferably obtaining the function of this invention, a grain size of about 1 mm to 10 mm is preferable, for example, in the case of the spherical or hemispherical shape. Further, the weight of each grain of the granular chemical strengthening salt is also not particularly limited, but, for example, it is preferably in the range of about 5 mg to 15 g.

As the glass disk for use in this invention, no particular limitation is provided as long as it can be chemically strengthened, but, among all, an aluminosilicate glass can be preferably cited. Such an aluminosilicate glass can precisely obtain a preferable compressive stress, compressive stress layer, and tensile stress by an ion exchange chemical strengthening method, particularly a low-temperature ion exchange chemical strengthening method and, therefore, it is particularly preferable as a chemically strengthened magnetic disk glass substrate.

As such an aluminosilicate glass, there can be preferably cited an aluminosilicate glass containing, as main components, 58 to 75 wt % $SiO_2$, 5 to 23 wt % $Al_2O_3$, 3 to 10 wt % $Li_2O$, and 4 to 13 wt % $Na_2O$ in composition ratio.

Further, it is preferable that an aluminosilicate glass contains, as main components, 62 to 75 wt % $SiO_2$, 5 to 15 wt % $Al_2O_3$, 4 to 10 wt % $Li_2O$, 4 to 12 wt % $Na_2O$, and 5.5 to 15 wt % $ZrO_2$ in glass composition ratio, wherein the weight ratio of $Na_2O/ZrO_2$ is 0.5 to 2.0 and the weight ratio of $Al_2O_3/ZrO_2$ is 0.4 to 2.5.

In order to obtain a glass substrate having surfaces with no projections that are caused by undissolved $ZrO_2$, use is preferably made of a glass for chemical strengthening containing, in mol %, 57 to 74% $SiO_2$, 0 to 2.8% $ZnO_2$, 3 to 15% $Al_2O_3$, 7 to 16% $Li_2O$, and 4 to 14% $Na_2O$.

Such aluminosilicate glasses increase in bending strength and become excellent also in Knoop hardness by chemical strengthening.

As the chemical strengthening method in the chemical strengthening treatment process of this invention, a known chemical strengthening method is applicable and there is no particular limitation. Chemical strengthening of a glass disk (substrate) is carried out, for example, by bringing the glass disk into contact with a heated molten chemical strengthening salt so as to carry out ion exchange between ions in a surface layer of the glass disk and ions of the chemical strengthening salt.

Herein, as ion exchange methods, there are known a low-temperature ion exchange method, a high-temperature ion exchange method, a surface crystallization method, a glass surface dealkalization method, and so on. In terms of a glass transition point, it is preferable to use the low-temperature ion exchange method that performs ion exchange in a range not exceeding the glass transition temperature. The low-temperature ion exchange method called herein represents a method that replaces alkali ions in a glass by alkali ions having a larger ion radius in a temperature range equal to or less than a glass transition temperature (Tg) and increases compressive stress in a surface layer of the glass by an increase in volume of an ion exchange portion, thereby strengthening the surface of the glass.

The temperature in such a chemical strengthening treatment, i.e. the heating temperature of a molten chemical strengthening salt when performing the chemical strengthening treatment, is preferably 280 to 660° C., particularly 300 to 400° C. in terms of acceleration of the ion exchange and so on.

The time for which the glass disk is in contact with the molten chemical strengthening salt (chemical strengthening treatment time) is only required to be sufficient for completion of the ion exchange and, normally, it is preferably set to about several hours to several tens of hours.

It is preferable that, before bringing the glass disk into contact with the molten chemical strengthening salt, the glass disk be heated to about 100 to 300° C. for the purpose of preheating.

The glass disk after the chemical strengthening treatment is subjected to cooling and cleaning processes so as to be a chemically strengthened magnetic disk glass substrate as a product.

In this invention, the chemical strengthening is carried out by melting the chemical strengthening salt introduced into the treatment vessel so as to obtain the molten chemical strengthening salt and bringing the glass disk into contact with the molten chemical strengthening salt, wherein a material excellent in corrosion resistance and thus with low generation of dust is preferable as a material of the treatment vessel. Since the chemical strengthening salt and the molten chemical strengthening salt are oxidative and, further, the treatment temperature is high, it is necessary to suppress damage and generation of dust by selecting the material excellent in corrosion resistance to thereby suppress thermal asperity failure and head crash failure. A quartz material is particularly preferable in terms of corrosion resistance, while, a stainless material, especially a martensite-based or austenite-based stainless material (e.g. SUS316L or SUS304) particularly excellent in resistance corrosion, is also preferable. The entire treatment vessel is not necessarily made of the quartz material or the stainless material and it is sufficient that at least a portion, adapted to contact the chemical strengthening salt and/or the molten chemical strengthening salt, of the inner wall of the treatment vessel is made of the quartz material or the stainless material.

Further, in this invention, the surfaces of the glass disk are preferably formed into mirror surfaces before applying the chemical strengthening. As a mirror polishing method, there can be preferably cited mirror polishing using a polishing solution containing cerium oxide abrasive grains and polishing pads or mirror polishing using a polishing solution containing colloidal silica abrasive grains and polishing pads. As the mirror surface quality in this case, it is preferable that the main surfaces be mirror surfaces, for example, having a surface roughness of 6 nm or less in Rmax and a surface roughness of 0.6 nm or less in Ra and the end surface be a mirror surface, for example, having Rmax being 0.01 to 1 μm and Ra being 0.001 to 0.8 μm. By performing the chemical strengthening by the use of such a glass disk whose surfaces are mirror-polished, the chemical strengthening can be uniformly applied to fine areas of the surfaces of the glass disk.

With respect to the thickness of the glass substrate in this invention, it is not necessary to particularly provide a limitation. However, as the thickness that can preferably achieve the function of this invention, there can be cited, for example, a thin glass substrate having a thickness of 0.2 mm to 0.9 mm, particularly 0.2 mm to 0.6 mm. According to this invention, even if the glass substrate is in the form of such a thin plate, it is possible to supply the high strength glass substrate with stable quality and at a low price, which is thus preferable.

A magnetic disk is obtained by forming at least a magnetic layer on the chemically strengthened magnetic disk glass substrate obtained according to this invention. For example, there can be cited a magnetic disk having a magnetic layer, a protective layer, and a lubricating layer formed in order on the glass substrate. The magnetic layer is preferably a Co-based magnetic layer suitable for increasing the recording density. As such a magnetic layer, there can be cited, for example, a CoPt-based magnetic layer or a CoCr-based magnetic layer. As a method of forming the magnetic layer, a DC magnetron sputtering method can be preferably cited.

Further, between the glass substrate and the magnetic layer, it is preferable to interpose an underlayer and so on for the purpose of size reduction of magnetic grains of the magnetic layer, orientation of the easy magnetization axis of the magnetic layer, and so on. As a material of the underlayer, use can be made of an AlRu-based alloy, a Cr-based alloy, or the like.

The protective layer serves to protect the magnetic disk from an impact of the magnetic head and a carbon-based protective layer can be preferably cited. Among carbon-based protective layers, a hydrogenated carbon protective layer or a nitrided carbon protective layer is excellent in adhesion to the lubricating layer and is particularly preferable. For the formation of the protective layer, there can be preferably cited the DC magnetron sputtering method, a plasma CVD method, or the like.

The lubricating layer serves to relax interference between the magnetic head and the magnetic disk and a perfluoropolyether (PFPE) compound can be preferably used. Since the PFPE has a flexible main chain structure, it can realize proper lubricity. As a method of forming the lubricating layer, a dipping method can be cited.

BEST MODE FOR CARRYING OUT THE INVENTION

Figure 1:
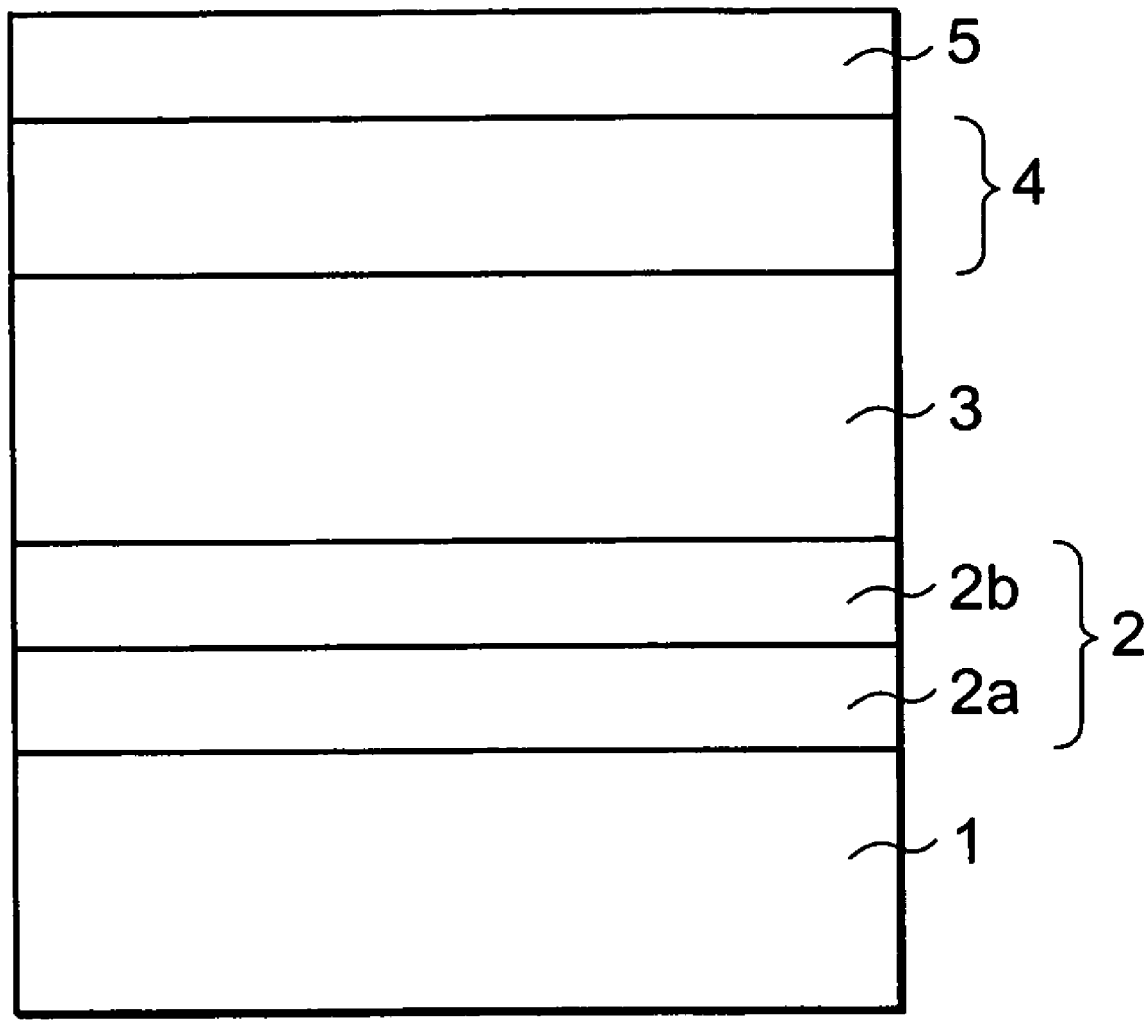
FIG. 1 is an exemplary sectional view of a magnetic disk of Example 2.

Hereinbelow, specific embodiments of this invention will be described in detail in terms of Examples, but, this invention is not limited to those embodiments.

Example 1

At first, there was prepared a glass disk made of an amorphous aluminosilicate glass.

Hereinbelow, description will be made about a manufacturing method of a chemically strengthened glass substrate for a magnetic disk according to this Example.

(1) Lapping Process (Grinding Process)

An amorphous glass disk having a diameter of 30 mm and made of an aluminosilicate glass was obtained from a molten glass by direct press. As the aluminosilicate glass, use was made of an aluminosilicate glass having a composition of $SiO_2$:63.6 wt %, $Al_2O_3$:14.2 wt %, $Na_2O$: 10.4 wt %, $Li_2O$: 5.4 wt %, $ZrO_2$:6.0 wt %, and $Sb_2O_3$:0.4 wt %.

Then, a lapping process was applied to the glass disk for improving its size accuracy and shape accuracy. This lapping process was carried out by the use of a double-sided lapping machine using abrasive grains with a grain size of #400. Specifically, at first, using alumina abrasive grains with a grain size of #400, setting a load to about 100 kg, and rotating a sun gear and an internal gear, both surfaces of the glass substrate placed in a carrier were lapped to a surface accuracy of 0 to 1 μm and a surface roughness (Rmax) of about 6 μm. Then, by the use of a cylindrical grinding stone, a hole was formed at a center portion of the glass substrate and its outer peripheral end surface was grounded and, thereafter, predetermined chamfering was applied to the outer peripheral end surface and an inner peripheral end surface. In this event, the surface roughness of the glass substrate end surfaces was about 4 μm in Rmax.

Then, the grain size of abrasive grains was changed to #1000 and the surfaces of the glass substrate were lapped, thereby obtaining a surface roughness of about 2 μm in Rmax and about 0.2 μm in Ra.

(2) Mirror Polishing Process

Then, the end surfaces (inner periphery and outer periphery) of the glass substrate were polished to about 1 μm in Rmax and about 0.3 μm in Ra by brush polishing while rotating the glass substrate.

Thereafter, in order to remove cracks and distortion remaining in the lapping process, a first mirror polishing process was carried out by the use of a planetary gear motion type double-sided polishing method. In a double-sided polishing machine, the glass substrate held by a carrier is tightly placed between upper and lower surface plates where polishing pads are bonded as polishers and the carrier is meshed with a sun gear and an internal gear, thereby clasping the glass substrate by the upper and lower surface plates. Thereafter, by supplying a polishing solution between the polishing pads and polishing surfaces of the glass substrate and through rotation, the glass substrate performs an orbital motion (planetary gear motion) while rotating on its axis on the surface plates, so that both surfaces of the glass substrate are simultaneously mirror-polished.

Specifically, hard polisher (hard urethane foam) polishing pads were used as the polishers to carry out the polishing process. As the polishing solution, use was made of free abrasive grains containing cerium oxide-based polishing abrasive grains (average grain size 1.3 μm) and pure water. The polishing conditions were set to load: 100 g/cm$^2$ and polishing time: 15 minutes.

Then, a second mirror polishing process was carried out by the use of a double-sided polishing machine of the same type as that used in the first mirror polishing process while polishers were changed to soft polishing pads (suede pads). This second mirror polishing process aims to reduce the surface roughness, for example, to 5 nm or less in Rmax and 0.5 nm or less in Ra while maintaining the flat surfaces obtained in the foregoing first mirror polishing process. Through this mirror polishing process, the surfaces of the glass substrate are finished to the mirror surface state. As a polishing solution, use was made of free abrasive grains containing cerium oxide-based polishing abrasive grains (average grain size 0.8 μm) and pure water. The polishing conditions were set to load: 100 g/cm$^2$ and polishing time: 5 minutes.

The glass substrate after the mirror polishing was cleaned with a cleaning solution containing sulfuric acid, thereby removing residuals such as the polishing abrasive grains.

The surface roughness of the obtained glass disk substrate was measured by an AFM (atomic force microscope) and it was confirmed to be a smooth mirror surface having Rmax of 4.8 nm and Ra of 0.45 nm. The surface roughness was calculated in accordance with Japanese Industrial Standard (JIS) B0601 from the surface area measurement results all by the AFM (atomic force microscope).

The obtained glass disk substrate had a diameter of 27.4 mm, an inner diameter of 7 mm, and a thickness of 0.38 mm.

(3) Chemical Strengthening Process

Then, a chemical strengthening process according to a low-temperature ion exchange method was carried out under the following conditions. The following process is preferably carried out in a clean room so as to prevent adhesion of dust and foreign matter. In this Example, the process was carried out in a clean room cleaner than class 8 in Japanese Industrial Standard (JIS) B9920, wherein the relative humidity in an atmosphere was maintained at 40% or less.

At first, there was prepared a granular chemical strengthening salt obtained by pressing powdery potassium nitrate into a globular shape by the use of a tabletting machine. The grain size of the chemical strengthening salt grains was set to 7 mm. Likewise, there was prepared a granular chemical strengthening salt obtained by pressing powdery sodium nitrate into a globular shape by the use of a tabletting machine. The grain size was set to 7 mm equal to that of the foregoing potassium nitrate grains.

There was prepared a chemical strengthening treatment vessel whose inner wall was made of a stainless material (SUS316L). The potassium nitrate grains and the sodium nitrate grains were introduced into the chemical strengthening treatment vessel so as to be 6:4 in weight ratio. Then, by heating the chemical strengthening treatment vessel, the chemical strengthening salts were melted into a molten chemical strengthening salt. The temperature of the molten chemical strengthening salt was set to 380° C. This molten chemical strengthening salt was sampled and the ion content therein was analyzed by an ICP (inductive coupling plasma) method. As a result, it was found that there was formed a pure molten chemical strengthening salt in which alkali ions other than sodium or potassium and other cations were hardly detected.

Then, the foregoing mirror-polished glass disk was immersed for 2 hours in the molten chemical strengthening salt within the chemical strengthening treatment vessel, thereby carrying out a chemical strengthening treatment. Since high compressive stress is formed on the surfaces of the glass disk through the chemical strengthening process, it is possible to obtain a glass substrate excellent in impact resistance.

The chemically strengthened glass disk was immersed in respective cleaning vessels of sulfuric acid, neutral detergent, pure water, pure water, IPA, and IPA (vapor drying) in order and then subjected to ultrasonic cleaning and drying, thereby obtaining a chemically strengthened glass substrate for a magnetic disk.

The surface roughness of the main surfaces of the obtained chemically strengthened magnetic disk glass substrate was measured by the AFM (atomic force microscope) and it was confirmed to be a smooth mirror surface having Rmax of 4.6 nm and Ra of 0.45 nm. Further, the surfaces of the glass substrate were subjected to visual inspection, optical inspection using reflection, scattering, and transmission of light, and observation using an electron microscope, but there was observed no adhesion of foreign matter or the like on the surfaces of the glass substrate, which may cause thermal asperity failure or head crash failure.

Then, the bending strength of the obtained magnetic disk glass substrate was measured. The bending strength was given in the form of a load imposed when the magnetic disk glass substrate was broken while increasing a load applied to the glass substrate. As the bending strength increases, the durability of the magnetic disk glass substrate increases. It was confirmed that the bending strength of the glass substrate in this Example was 18 kg/f and thus the sufficient strength was obtained as a magnetic disk substrate.

After manufacturing 100,000 chemically strengthened magnetic disk glass substrates of this Example in the manner as described above, the inner wall of the chemical strengthening treatment vessel was observed, but no abnormality such as corrosion was observed.

Example 2

By the use of the chemically strengthened magnetic disk glass substrate obtained in Example 1, a magnetic disk of this Example was manufactured.

The magnetic disk in this Example is a magnetic disk having a magnetic layer, a protective layer, a lubricating layer, and so on formed in order on the magnetic disk glass substrate obtained in Example 1. FIG. 1 shows an exemplary sectional view thereof. In FIG. 1, 1 denotes a glass substrate, 2 a nonmagnetic metal layer composed of a seed layer 2a and an underlayer 2b, 3 a magnetic layer, 4 a protective layer, and 5 a lubricating layer.

Now, a manufacturing method of this magnetic disk will be described.

On the foregoing glass substrate 1 (chemically strengthened magnetic disk glass substrate obtained in Example 1), the nonmagnetic metal layer 2, the magnetic layer 3, and the protective layer 4 were formed in order in an argon atmosphere by the use of the DC magnetron sputtering method.

At first, the seed layer 2a was formed on the glass substrate 1. The seed layer 2a functions to uniformly reduce the size of magnetic grains of the magnetic layer and exhibits an effect of improving the magnetic properties. As a material of the seed layer 2a, an AlRu alloy was used. Then, the underlayer 2b was formed. The underlayer 2b functions to orient the easy magnetization axis of the magnetic layer in an in-plane direction of the disk. As a material of the underlayer 2b, a CrW alloy was used.

Then, the magnetic layer 3 was formed. As a material of the magnetic layer, use was made of a ferromagnetic layer of a CoCrPtTa alloy. Further, the protective layer 4 was formed on the magnetic layer 3. Specifically, an acetylene gas was used to form a hydrogenated carbon protective layer. The film thickness was 5 nm. Then, the lubricating layer 5 was formed on the protective layer 4 by the dipping method. Specifically, a lubricant made of a perfluoropolyether compound was coated. The film thickness was 1 nm. After forming the lubricating layer 5, a heat treatment was carried out at 100° C. to tightly adhere the lubricating layer 5 to the protective layer 4.

In the manner as described above, a magnetic disk 10 of this Example was obtained.

Then, various evaluations of the obtained magnetic disk were conducted.

At first, as a result of performing a glide test according to a touchdown height method in order to evaluate the flying characteristics of a magnetic head, it was confirmed that the touchdown height was 4.5 nm and the head did not contact the magnetic disk until the flying height became 4.5 nm. When the flying height of the magnetic head is 10 nm, the touchdown height is required to be 5 nm or less. It is understood that the magnetic disk of this Example can achieve the excellent characteristics.

Then, a LUL (load/unload) durability test was conducted. Specifically, a LUL (load/unload) type HDD (hard disk drive) was prepared. This HDD is of a type having a recording density of 40 Gbits/inch$^2$ and is incorporated with a magnetic head having a NPAB slider and a GMR reproducing element. The flying height of the incorporated magnetic head is 10 nm.

As a result of mounting the foregoing magnetic disk 10 in this HDD and continuously carrying out LUL operations, it was able to withstand 600,000 consecutive LUL operations without trouble or failure. No head crash failure occurred. It is reported that when a normal commercial HDD is used in a general manner, use for about 10 years is necessary for the number of LUL times to exceed 400,000 times. It is understood that the magnetic disk of this Example guarantees high reliability. The foregoing LUL durability test was performed in an environment with a temperature of 60° C. and a relative humidity of 80% so as to simulate a severe environment.

Further, a recording/reproducing test was conducted at an information density of 700 kFci, but no thermal asperity was observed.

As described above, by the use of the chemically strengthened magnetic disk glass substrate, it is possible to provide the excellent magnetic disk that can prevent thermal asperity failure and head crash failure even at a low flying height of 10 nm.

Comparative Example

Next, a magnetic disk glass substrate of this Comparative Example was manufactured. Specifically, in the chemical strengthening process of Example 1, powdery chemical strengthening salt materials were introduced into a chemical strengthening treatment vessel as they are, i.e. without using chemical strengthening salts formed into grains. The mixing ratio of potassium nitrate and sodium nitrate was the same as in Example 1. Except the point mentioned above, the chemically strengthened magnetic disk glass substrate was manufactured by the same manufacturing method as in Example 1.

The obtained magnetic disk glass substrate was observed by the AFM and the surface roughness was 5.0 nm in Rmax and 0.49 nm in Ra. Visual inspection and optical inspection were performed like in Example 1, but no abnormality was particularly observed. However, according to observation using the electron microscope, a very small amount of adhesion of foreign matter was confirmed. This foreign matter was analyzed in detail by an EDX (energy dispersive X-ray detector) and a peak including Fe was observed. Considering these analysis results together, the substance forming the foreign matter is estimated which contains stainless and a cause for its generation is considered to be the stainless material forming the chemical strengthening treatment vessel. For completely removing this foreign matter, it is necessary to level up the cleaning after the chemical strengthening treatment to increase the cleaning strength or prolong the cleaning time. The bending strength of the obtained glass substrate was the same as in Example 1.

After manufacturing 100,000 chemically strengthened magnetic disk glass substrates of this Comparative Example, the inner wall of the chemical strengthening treatment vessel was observed and, as a result, corrosion estimated to be caused by damage was slightly confirmed near a portion where the chemical strengthening salts were introduced.

Then, films were formed in order on the magnetic disk glass substrate of this Comparative Example like in Example 2, thereby obtaining a magnetic disk.

Evaluations were carried out like in Example 2 and the touchdown height was 5.0 nm. However, when the flying height of the magnetic head is set to 10 nm, there is no allowable flying margin at all and, therefore, there is a possibility that the HDD cannot be safely operated.

Then, a LUL durability test was performed and crash failure occurred when the number of LUL times reached 500,000. Further, a recording/reproducing test was conducted and it was within an allowable limit with ECC while a thermal asperity signal was detected.

As described above, according to this invention, since it is possible to suppress contamination of a molten chemical strengthening salt caused by generation of particles at the time of introduction of a chemical strengthening salt into a treatment vessel or generation of dust or the like in the treatment vessel due to damage thereof, the pure molten chemical strengthening salt can be obtained and, therefore, thermal asperity failure and head crash failure can be effectively prevented. Further, since the molten chemical strengthening salt can be pure, thermal asperity failure and head crash failure can be suitably prevented without particularly leveling up precision cleaning after a chemical strengthening process and, therefore, it is possible to cope with a low flying height of 10 nm or less of a magnetic head. Further, from the viewpoints that a granular chemical strengthening salt is difficult to spread and thus easy to handle, that humidity control thereof in a strict atmosphere is unnecessary, that it is not necessary to particularly level up the precision cleaning after the chemical strengthening, and so on, a cost reduction can be achieved. Therefore, it becomes possible to provide a high quality magnetic disk glass substrate and a high quality magnetic disk at low prices.

The invention claimed is:

1. A chemical strengthening treatment method of a magnetic disk glass substrate, used in an information recording medium for a HDD, wherein a chemical strengthening salt is introduced into a treatment vessel and is melted to obtain a molten chemical strengthening salt and a glass disk is brought into contact with said molten chemical strengthening salt so as to be chemically strengthened, said method comprising:
   shaping powder into a granular chemical strengthening salt which has a grain size between 1 mm and 10 mm;
   introducing the granular chemical strengthening salt into the treatment vessel with scattering of the granular chemical strengthening salt being prevented, and
   melting the granular chemical strengthening salt into a molten chemical strengthening salt with which the substrate is contacted so as to obtain a chemical strengthened magnetic disk glass substrate.

2. A chemical strengthening treatment method of a magnetic disk glass substrate, according to claim 1, wherein said glass disk is made of aluminosilicate glass.

3. A method of manufacturing a chemically strengthened magnetic disk glass substrate, comprising:
   carrying out a chemical strengthening treatment by the chemical strengthening treatment method according to claim 1.

4. A method of manufacturing a magnetic disk, comprising:
   forming at least a magnetic layer on the glass substrate obtained by the method according to claim 3.

5. A chemical strengthening treatment method of a magnetic disk glass substrate, according to claim 1, wherein the granular chemical strengthening salt is formed of grains which have a weight between 5 mg and 15 g.

6. A chemical strengthening treatment method of a magnetic disk glass substrate, according to claim 1, wherein the chemically treated substrate has a surface with Rmax of approximately 4.6 nm and Ra of approximately 0.45 nm.

7. A chemical strengthening treatment method of a magnetic disk glass substrate, according to claim 1, wherein the chemically treated substrate has a surface with Rmax of 4.6 nm or less and Ra of 0.45 nm or less.

* * * * *